UNITED STATES PATENT OFFICE 2,453,677

ALKAMINE ESTERS OF PYRROLE-3,4-DICARBOXYLIC ACIDS

Jackson P. Sickels, Plainfield, N. J., assignor to American Cyanamid Company, New York, N. Y., a corporation of Maine No Drawing. Application November 13, 1946, Serial No. 709,410

11 Claims. (Cl. 260—313)

This invention relates to new alkamine esters of 1-aralkylpyrrole-3,4-dicarboxylic acids.

The compounds of the present invention may be represented by the following general formula:

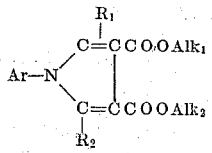

in which Ar is aralkyl, $R_1$ and $R_2$ are hydrogen or alkyl, and $Alk_1$ and $Alk_2$ are residues of dialkylamino alcohols.

The compounds of the present invention are not intended to be limited to any particular method of production, but we have found that it is preferable to produce the compounds by catalyzed alcoholysis of the corresponding dialkyl esters. The pyrrole nucleus may be unsubstituted on the 2 and 5 carbon atoms or there may be alkyl substituents. In general the alkyl esters are prepared by reacting the dialkyl ester of a diketosuccinate with an aralkylamine under the standard conditions for this general reaction described by Knorr, Berichte, vol. 18, page 299 et seq. The simplest diketosuccinate is the diacetosuccinate and this produces a 1-aralkyl-2,5-dimethyl-3,4-dicarbalkoxypyrrole.

Other diketosuccinates may be used such as the dipropionosuccinate which will produce a 1-aralkyl-2,5-diethyl-3,4-dicarbalkoxypyrrole.

The alcoholysis is preferably catalyzed with a small amount of an alkali metal alcoholate. Sodium is preferred because it is cheaper and while potassium gives equally good results its higher cost is not warranted. The alcoholysis reaction is not critical as to amounts of catalyst so long as they are below stoichiometric amounts. Excellent results are obtained with an amount of alcoholate of the order of magnitude of $\frac{1}{10}$ stoichiometric equivalents. The alcoholysis is preferably carried out in the presence of an excess of the dialkylamino alcohol which is to be introduced. The alcoholate may be introduced into the reaction mixture in preformed state or the alkali metal may be dissolved in the amino alcohol or added to the reaction mixture. The method of introduction is not critical, but we prefer to introduce the alcoholate by dissolving the alkali metal in the amino alcohol. The smoothness with which the alcoholysis reaction proceeds is surprising, in view of the known sensitiveness to oxidation in alkaline solution of amino alcohols and their esters. No explanation is advanced why the reaction of the present invention proceeds so readily in spite of the known sensitiveness of the reactants and products to oxidation.

The esters in the form of the free bases are for the most part oils boiling at high temperatures. They can be transformed into salts of strong mineral acids, such as hydrochlorides, by reaction with the anhydrous acid, preferably in solution in an organic solvent such as ether. The hydrochlorides are fairly soluble in water and permit use of some of the compounds of the present invention as local anaesthetics. The compounds also activate rubber vulcanization accelerators.

The invention will be described in greater detail in conjunction with the following specific examples in which the parts are by weight and the temperatures are uncorrected unless otherwise stated.

Example 1

Di(β-diethylaminoethyl) 1-benzyl-2,5-dimethylpyrrole-3,4-dicarboxylate

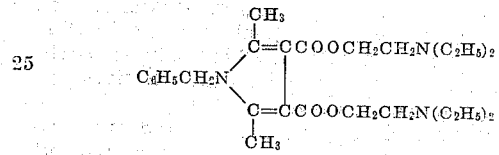

Diethyl-1-benzyl-2,5-dimethylpyrrole-3,4-dicarboxylate is prepared by condensing benzylamine with diethyldiacetosuccinate in glacial acetic acid solution and 218 parts of the product are dissolved in 465 parts of β-diethylaminoethanol in which 2 parts of sodium have been dissolved. The reaction mixture is heated for a long period at 130–135° C. and is then distilled through a fractionating column provided with a large ratio of reflux, the first material coming over at 78° C., and the temperature gradually rising until excess β-diethylaminoethanol begins to come off, whereupon the pressure is reduced and distillation continued. A residual oil is obtained which is distilled at about 2 mm. pressure, the boiling point being between 244–251° C. The product obtained has a refractive index of about 1.53. The same oil is obtained by starting from dimethyl-1-benzyl-2,5-dimethylpyrrole-3,4-dicarboxylate, the reaction proceeding in the same manner but with a slightly lower temperature in the reflux column in the beginning, corresponding to the boiling point of methyl alcohol.

The dihydrochloride may be prepared by reacting the basic ester with dry hydrogenchloride in ether solution.

Example 2

Di(γ-diethylaminopropyl)-1-benzyl-2,5-dimethylpyrrole-3,4-dicarboxylate

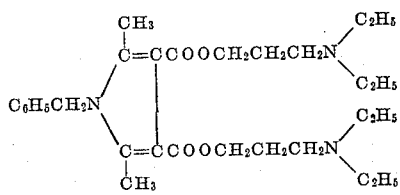

218 parts of diethyl-1-benzyl-2,5-dimethylpyrrole-3,4-dicarboxylate are dissolved in about 500 parts of γ-diethylaminopropanol in which about 2 parts of sodium have been dissolved. The reaction mixture is heated for a long period at 130–135° C. and is then distilled through a fractionating column with a high ratio of reflux. Ethyl alcohol set free in the reaction first distills off and then the temperature rises to the boiling point of the diethylaminopropanol, whereupon the pressure is reduced and the excess amino alcohol is distilled off under reduced pressure. The residue is dissolved in ether, washed with water and dried, and a high boiling oil is obtained which cannot be distilled under atmospheric pressure without decomposition.

Example 3

Di-(β-diethylaminoethyl)-1-methylbenzyl-2,5-dimethylpyrrole-3,4-dicarboxylate

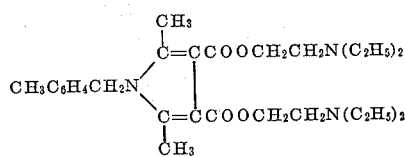

230 parts of diethyl-1-methylbenzyl-2,5-dimethylpyrrole-3,4-dicarboxylate are prepared by condensation of a para-methylbenzylamine with diethyldiacetosuccinate in glacial acetic acid solution and 230 parts are dissolved in about 465 parts of β-diethylaminoethanol in which 2 parts of sodium have been dissolved.

The reaction mixture is then heated and distilled as described in the foregoing examples and the residue extracted with ether and washed. A high boiling residual oil is obtained which does not distill at atmospheric pressure without decomposition.

Example 4

Di(β-diethylaminoethyl)-1-phenylethyl-2,5-dimethylpyrrole-3,4-dicarboxylate

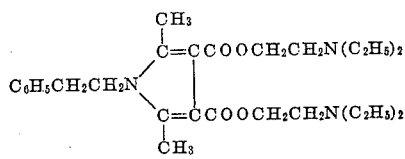

Diethyl-1-phenylethyl-2,5-dimethylpyrrole-3,4-dicarboxylate is prepared by condensation of β-phenylethylamine with diethyldiacetosuccinate in glacial acetic acid solution and 250 parts of the product are dissolved in 480 parts of β-diethylaminoethanol in which about 2 parts of sodium have been dissolved. The reaction mixture is then heated and distilled as described in the foregoing examples, the residual oil extracted with ether and washed and dried. It does not distill at atmospheric pressure without decomposition.

Example 5

Di(β-dimethylaminoethyl) 1-benzyl-2,5-dimethylpyrrole-3,4-dicarboxylate

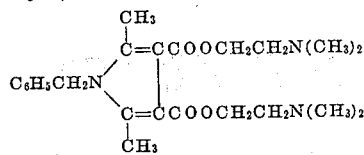

The procedure of Example 1 is followed, substituting an equivalent amount of β-dimethylaminoethanol for the 465 parts of β-diethylaminoethanol. An oil is obtained which resembles the product of Example 1 and can not be distilled under atmospheric pressure without decomposition.

Example 6

Di(γ-dipropylaminopropyl)-1-benzyl-2,5-dimethylpyrrole-3,4-dicarboxylate

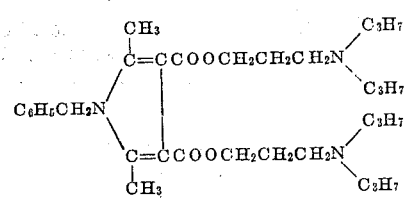

The procedure of Example 2 is followed, substituting a stoichiometrically equivalent amount of dipropylaminopropanol for the 500 parts of γ-diethylaminopropanol. A high boiling oil is obtained having properties similar to that of Example 2 and incapable of distillation under atmospheric pressure without decomposition.

This application is in part a continuation of my copending application Serial No. 496,964, filed July 31, 1943, now abandoned.

I claim:

1. A member of the group consisting of diesters of dialkylamino alkanols and 1-aralkylpyrrole-3,4-dicarboxylic acids and salts of the esters with strong mineral acids.

2. A member of the group consisting of diesters of dialkylamino alkanols and 1-aralkyl-2,5-dimethylpyrrole-3,4-dicarboxylic acids and salts of the esters with strong mineral acids.

3. A member of the group consisting of diesters of dialkylamino alkanols and 1-benzyl-2,5-dimethylpyrrole-3,4-dicarboxylic acids and salts of the esters with strong mineral acids.

4. Compounds according to claim 2 in which the alkylamino alcohol is β-diethylaminoethanol.

5. A member of the group consisting of di(β-diethylaminoethyl)-1-benzyl-2,5-dimethylpyrrole-3,4-dicarboxylate having the formula:

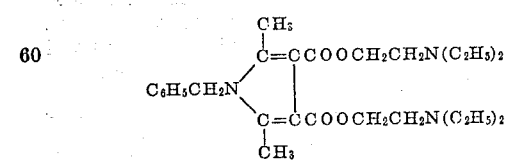

and their salts with strong acids.

6. A method of preparing a dialkamine ester of 1-aralkylpyrrole-3-carboxylic acids which comprises subjecting the diethyl ester of a 1-aralkylpyrrole-3,4-dicarboxylic acid to alcoholysis with a dialkylamino alkanol in the presence of a catalytic amount of an alkali metal alcoholate.

7. A method of preparing a dialkamine ester of 1-aralkyl-2,5-dimethylpyrrole-3,4-dicarboxylic acid, which comprises subjecting the diethyl ester of the dicarboxylic acid to alcoholysis with a dialkylamino alkanol in the presence of a catalytic amount of an alkali metal alcoholate.

8. A method of preparing a dialkamine ester of 1-benzylpyrrole-3,4-dicarboxylic acids which comprises subjecting the diethyl ester of a 1-benzylpyrrole-3,4-dicarboxylic acid to alcoholysis with a dialkylamino alkanol in the presence of a catalytic amount of an alkali metal alcoholate.

9. A method according to claim 6 in which the dialkylamino alkanol is $\beta$-diethylaminoethanol.

10. A method according to claim 7 in which the dialkylamino alkanol is $\beta$-diethylaminoethanol.

11. A method according to claim 8 in which the dialkylamino alkanol is $\beta$-diethylaminoethanol.

JACKSON P. SICKELS.

No references cited.